United States Patent [19]

Phillips et al.

[11] Patent Number: 4,504,032
[45] Date of Patent: Mar. 12, 1985

[54] CONTROL OF NUTATION IN A SPACECRAFT

[75] Inventors: Kevin J. Phillips, East Windsor; Terry G. Tracy, Cranbury, both of N.J.

[73] Assignee: RCA Corporation, New York, N.Y.

[21] Appl. No.: 356,824

[22] Filed: Mar. 10, 1982

[51] Int. Cl.³ .............................................. B64G 1/38
[52] U.S. Cl. ................................................. 244/170
[58] Field of Search ............... 244/169, 170, 171, 164, 244/165, 166, 176; 364/459, 434

[56] References Cited

U.S. PATENT DOCUMENTS

| Re. 30,429 | 11/1980 | Phillips | 244/169 |
|---|---|---|---|
| 3,437,288 | 4/1969 | Lam | 244/169 |
| 3,591,108 | 7/1971 | Perkel et al. | 244/1 |
| 3,695,554 | 1/1972 | Phillips | 244/15 A |
| 3,830,447 | 8/1974 | Phillips | 244/15 A |
| 4,193,570 | 3/1980 | Hoffman et al. | 244/170 |
| 4,370,716 | 1/1983 | Amieux | 244/169 |

OTHER PUBLICATIONS

U.S. patent application Ser. No. 227,343 filed Jan. 22, 1981, of Muhlfelder et al., entitled, "Magnetically Torqued Nutation Damping".

*Primary Examiner*—Galen L. Barefoot
*Attorney, Agent, or Firm*—Joseph S. Tripoli; Robert L. Troike

[57] ABSTRACT

A method and apparatus for damping nutation in a spacecraft to essentially zero in less than one nutation period which has a spin axis, first and second transverse axes and a characteristic nutation frequency $\lambda$. A time interval $t_1$ after the transverse momentum of the spacecraft about one transverse axis, such as the Y axis has crossed zero, a torque of magnitude $T_Y$ is applied to the spacecraft about its Y transverse axis. After a time interval $t_2$, the application of this torque is terminated. The time $t_1 = 1/\lambda \cos^{-1}(h_{Y0}\lambda/2T_Y)$ and the time $t_2 = 2/\lambda \sin^{-1}(h_{Y0}\lambda/2T_Y)$, where $h_{Y0}$ is the peak body momentum about the Y transverse axis.

3 Claims, 3 Drawing Figures

CONTROL OF NUTATION IN A SPACECRAFT

This invention relates to nutation control systems and more particularly to rapidly minimizing nutation of momentum stabilized spacecraft such as spin stabilized spacecraft or dual-spin spacecraft.

A particular type of satellite suitable for accurate stabilization with very small pointing errors is the dual-spin spacecraft which consists of a platform, the angular position of which is stabilized relative to the earth by the reaction torque generated by changes in speed of a motor-driven spinning member termed a "spinning drum," a momentum wheel, an attitude control wheel or a stabilizing wheel. For purpose of the present application, the spinning member is generically termed a "momentum wheel" and the platform a "despun-platform" both as now commonly designated in the art.

Basically a spin-stabilized spacecraft exhibits certain types of troublesome motion called wobble, precession or nutation. All such motions tend to result in a displacement of the satellite geometric axis from its intended mission orientation or attitude.

Nutation, the coning motion of the pitch or spin axis about the total angular momentum vector, may result from any one or more of the following disturbances: (1) final stage booster nutation, (2) operation of the separation equipment, (3) operation of the attitude control and station-keeping components, (4) bombardment by micrometeorites, and (5) operation of components with uncompensated momentum.

Nutation, as defined herein, is the cyclic rotational motion of both of the transverse (nonspinning) axes which causes a rotational coning motion of the pitch (spinning) axis about the total or resultant momentum vector of the spacecraft. The frequency rate of the coning motion is termed a "nutation frequency" ($\lambda$). The cone angle of such motion is the amplitude of the nutation which is a measure of the pointing error referred to above.

In conventional design procedures, nutation may be reduced by energy-absorbing or momentum transfer devices operable on either or both of the transverse control axes (the axes perpendicular to the pitch or spin axis) to attenuate nutation. Active dampers overcome nutation effects on the pitch axis by developing a torque of opposite phase to that of the nutation torque. Such active dampers may be in the form of propulsion jets or a reaction wheel in addition to the momentum wheel of a despun system such as disclosed in U.S. Pat. No. 3,591,108, issued July 6, 1971 to RCA Corporation based on the invention of H. Perkel and W. H. Comerford, entitled "CONTROL SYSTEM FOR SPINNING BODIES." A system for providing active nutation damping in a dual-spin spacecraft using the momentum wheel is described in U.S. Pat. No. 3,695,554, entitled "NUTATION DAMPING IN DUAL-SPIN SPACECRAFT," by K. J. Phillips, assigned to the same assignee as this application. An active nutation damper in the form of a magnetic torquer which develops a torque of opposite phase to that of nutation torque is described in application Ser. No. 227,343, filed Jan. 22, 1981, entitled "MAGNETICALLY TORQUED NUTATION DAMPING" by L. Muhlfelder et al., assigned to the same assignee as this application, and incorporated herein by reference. In this type of damper, a torque is developed from the interaction of the earth's magnetic field with a magnetic dipole developed by current through a torquing coil in the spacecraft.

While the other devices described above have been used to damp nutation, they are not designed to cancel all nutation motion within its nutation cycle or for any initial condition. It is desirable to provide a means for rapidly damping nutation when it occurs, to provide optimum operation of the satellite. This is particularly so in the case of a communication satellite which employs an antenna which produces a narrow beam. Nutation could cause such a beam to be misdirected and this could cause communication problems. In addition, the sooner the nutation can be damped, the less it is likely to grow into a larger nutation which would require more time for a given torque.

In accordance with one embodiment of the present invention, a system for rapidly reducing the nutation of a momentum stabilized spacecraft to a low or essentially zero value in less than a single nutation period where the spacecraft has a spin axis and a characteristic nutation frequency includes a torquer providing a given torque value $T_j$ about a first axis j transverse to said spin axis, a sensor for determining the nutational motion of the spacecraft about said first transverse axis, logic means coupled to said sensor and said torquer for energizing said torquer a predetermined time period $t_1$ after the sensed nutational motion reaches a predetermined value where time $t_1$ is a function of the peak body momentum about the first transverse axis, the characteristic nutation frequency, the torque value $T_j$ and the predetermined value. The system further includes logic means for de-energizing said torquer after a predetermined time $t_2$ after energizing where $t_2$ is a function of the peak body momentum about the first transverse axis, the characteristic nutation frequency and the torque value.

Figure 1:
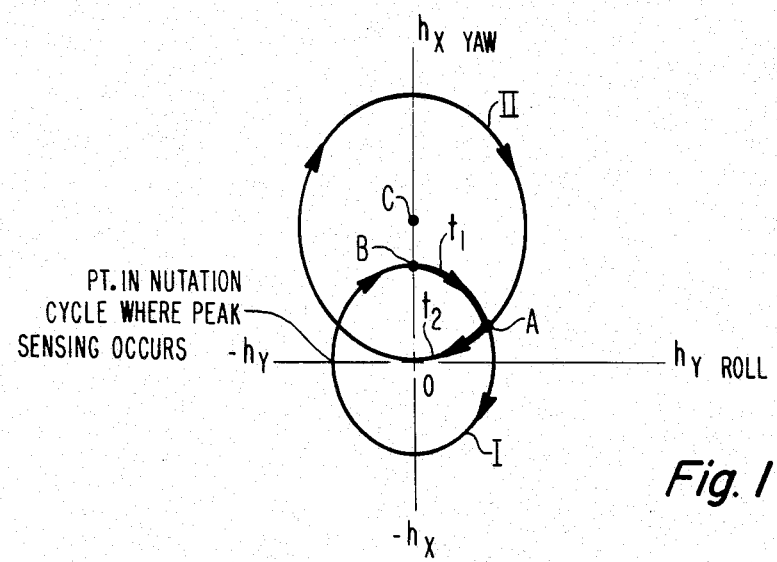
FIG. 1 is a graphical representation of the operation of the system according to one embodiment of the present invention where torquing is applied about the roll axis.

The principle of operation of the system of this application is based on the fact that the motions of the axes transverse to spin axes are coupled. With proper timing, motion of both transverse axes can be driven to zero by a torquing device on one axis. This is illustrated in FIG. 1. The $h_X$ and $h_Y$ coordinates in FIG. 1 represent the momentum about the yaw and roll axes, respectively. An axis through the origin (at zero) perpendicular to these axes or perpendicular to the page represents the bias momentum on the spin or Z axis. Ellipses I and II illustrate the locus of the component of total system momentum in the spacecraft body transverse plane rotating at the nutation frequency in the spacecraft body fixed frame. The coordinate system in FIG. 1 is spacecraft body referenced with the spacecraft total momentum vector along the Z axis (into the page). Ellipse I illustrates a typical torque free initial nutational state. Ellipse II illustrates a locus generated by a given constant torque. This locus centered at point C is selected such that it passes through the origin.

In accordance with this invention, by turning on the torquer when the torque free trajectory is at point A, ellipse II is followed. The torquer is then turned off at the origin (o), leaving both axes with essentially zero motion. The torquer may be either a magnetic torquer as discussed in Ser. No. 227,343, filed Jan. 22, 1981 or may be thrusters or a momentum wheel as discussed in U.S. Pat. No. 3,695,554, incorporated herein by reference. The torque magnitude, however, is represented by $T_Y$ in FIG. 1, being a torque about the $-Y$ axis and its locus is represented in FIG. 1 by ellipse II with its center along $h_X$ axis at point C. The coordinate of point C on the $h_X$ axis equals $T_Y/\lambda_2$. The term $\lambda_2$ is defined below. The negative peak body momentum is detected for this example about the roll axis about which the torquer is to operate. This is represented by $h_{YO}$. The peak body momentum may be detected by a peak detector coupled to, for example, a roll gyro sensor. The characteristic nutation frequency of the spacecraft is determined. This is a characteristic which is well-known for all spacecraft and records are kept of this value. The nutation frequency $\lambda$ may be determined from the equation $\lambda=(\lambda_2 \cdot \lambda_1)^{\frac{1}{2}}$ where $\lambda_2$ equals $(h+(J_Z-J_X)\Omega)/J_X$ and $\lambda_1$ equals $(h+(J_Z-J_Y)\Omega)/J_Y$ where $J_X$, $J_Y$ and $J_Z$ are the inertias about the yaw, roll, and spin axes, respectively. $\Omega$ is the body spin rate about the spin axis and h is the bias momentum on the spin axis or the wheel momentum in the case where there is a momentum wheel. According to one embodiment of the present invention, a timer is made to start when, for the example, the sensed transverse body momentum about the roll axis crosses zero as detected at point B in FIG. 1 and measures out a predetermined time $t_1$ to point A. At point A a start torquing signal is produced at the timer. This time $t_1$ is related to the nutation frequency $\lambda$, the peak transverse momentum $h_{YO}$ and the torque $T_Y$ by the following equation which is used to calculate the value of $t_1$:

$$t_1 = 1/\lambda \cos^{-1}(h_{YO}\lambda/2T_Y). \tag{1}$$

When time $t_1$ between B and A (the point where ellipses I and II cross) has elapsed, a torquer producing a torque of magnitude $T_Y$ is energized in response to the torquing signal and the torquer applies this torque to the body for a time period $t_2$ which is determined by the equation:

$$t_2 = 2/\lambda \sin^{-1}(h_{YO}\lambda/2T_Y). \tag{2}$$

Figure 2:
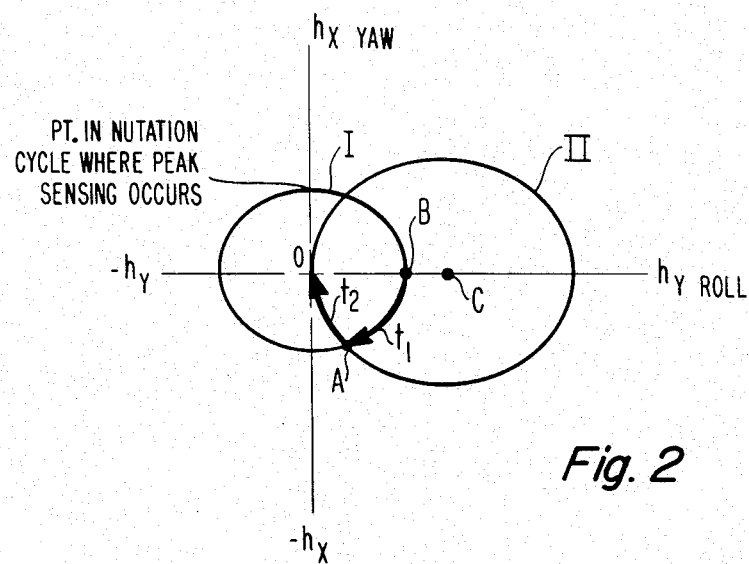
FIG. 2 is a graphical representation of the operation of the system according to the present invention where torquing is applied about the yaw axis.

Although the above example discusses torquing about the roll axis, a similar torquing scheme can be provided to torque about the yaw axis as indicated, for example, in FIG. 2. In FIG. 2, ellipse I illustrates the nutation and $h_X$ and $h_Y$ coordinates representing the momentum about the yaw and roll axes, respectively. Ellipse I illustrates the locus of the component of total system momentum in the spacecraft body transverse plane, the locus rotating at the nutation frequency in the spacecraft body fixed frame with the spacecraft total momentum vector along the $+Z$ axis (into the page). In this case, torquing of magnitude $T_X$ (about the $+X$ axis) produces the momentum illustrated by ellipse II whose center C is along the $h_Y$ axis as indicated. In this case, the time $t_1$ starts when the sensed positive transverse body momentum about the yaw axis crosses zero as indicated at point B and ends at point A where ellipses I and II cross. Point A represents the instant of time at which the torquer is energized. The torquing continues for the time period $t_2$ between A and O and is then stopped (at which time all transverse momentum has been reduced to essentially zero). The value of the detected positive peak body momentum in the FIG. 2 case would be about the $h_X$ or yaw axis and its value $h_{XO}$ is substituted for the value of $h_{YO}$ in the above equations for $t_1$ and $t_2$. This value may be taken from a yaw gyro sensor. Additionally, the torque $T_X$ would be substituted for the torque $T_Y$ in those equations. Otherwise the equations for $t_1$ and $t_2$ are the same for both cases of torquing.

Figure 3:
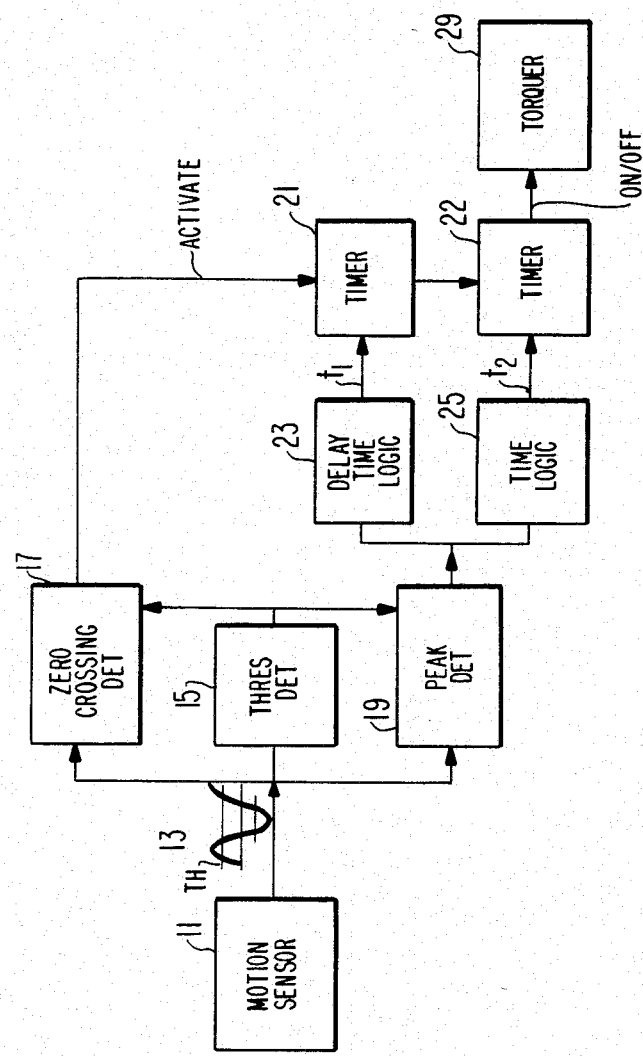
FIG. 3 is a block diagram illustrating a rapid active nutation damping system according to one embodiment of the present invention.

FIG. 3 is a block diagram of the system for achieving the rapid active nutation damping discussed above. An angular motion sensor 11 which may be a roll axis rate gyro for the example of FIG. 1, detects the body fixed rate about the roll axis. This is the $h_Y$ axis for the operation as discussed in connection with FIG. 1. The detected motion represented by signal 13 is sinusoidal if nutation is present. If the detected motion exceeds a certain predetermined value, which is the nutation threshold (TH), a threshold detector 15 detects this excessive nutation and activates a peak detector 19 and a zero-crossing detector 17. For the case of FIG. 1, the $h_Y$ or roll axis zero-crossing is detected and for the case of FIG. 2, the $h_X$ zero-crossing is detected. The peak detector 19 detects the negative peak amplitude of the motion ($h_{YO}$ for FIG. 1 case) and the zero-crossing detector 17 activates a timer 21 at the next sign change of the detected motion. Zero-crossing is used as a timing reference rather than the peak since it is more precisely measured. The time delay logic 23 and time logic 25 are responsive to the detected peak body momentum ($h_{YO}$ for FIG. 1 case) and calculate the times $t_1$ and $t_2$, respectively, from the equations discussed above. These logic states are preloaded with the value of $\lambda$ (the nutation frequency) and the value of the magnitude $T_Y$, of the torque produced by the torquer 29. The timer 21 is started in response to the signal from detector 17 and is stopped at time $t_1$ later by the output of the logic 23. When the timer 21 stops, it provides an output signal which activates (starts) timer 22 and activates torquer 29. The timer 22 is stopped at time $t_2$ in response to the output signal from logic 25. The timer 22 turns on torquer 29 at the end of time period $t_1$, that is, when timer 22 starts, and turns off torquer 29 at the end of time period $t_2$, that is, when timer 22 stops.

The functions of elements 23, 21, 22, and 25 can be performed, for example, by a computer on the spacecraft or with the aid of a microprocessor. The system works equally well detecting the peak momentum about the yaw axis and calculating the times $t_1$ and $t_2$ using this value for $h_{XO}$ and detecting the yaw axis momentum zero crossing. Since nutation period is in seconds, the times $t_1$ and $t_2$ are in seconds.

A more detailed description of a magnetic torquer may be found on pages 196-198 of MODERN SPACECRAFT DYNAMICS & CONTROL, by Marshall Kaplan, published by John Wiley & Sons, New York.

It is recognized that the embodiment shown and the operation and equations described in connection with FIGS. 1 and 2 are only by way of example. In a more generalized case, the means for sensing the peak nutational motion about an arbitrary axis transverse to the spin axis and the times $t_1$ and $t_2$ are described by the following equations:

$$t_1 = 1/\lambda \cos^{-1}(h_{jO}\lambda/2T_j) \tag{3}$$

$$t_2 = 2/\lambda \sin^{-1}(h_{jO}\lambda/2T_j) \quad (4)$$

where $h_{jO}$ is the peak body momentum about the arbitrary transverse axis (j), $\lambda$ is the characteristic nutation frequency, $T_j$ is the value of the torque applied by the torquer. The time $t_1$ begins with the sensor sensing zero on the arbitrary axis. It is also to be noted that the sensor does not have to be located on the torquer axis to sense the peak nutational motion of a spacecraft about the torquer axis. It may be located to sense about any arbitrary axis transverse to the spin axis and the angle in the transverse plane taken into consideration to arrive at the sensed peak nutational mmotion about the torquer axis.

The sensor may also detect peak nutational motion by an accelerometer or by a horizon sensor. The signal from an accelerometer which represents acceleration can be integrated to get a peak rate and hence momentum. Using the signal from an accelerometer directly (without integration) can also be utilized to sense the peak nutational motion about a transverse axis and to achieve the same timing result. However, the signal processing to achieve the timing would have to take into account the phase shifting associated with this sensor.

What is claimed is:

1. An apparatus for reducing nutation of a momentum stabilized spacecraft to essentially zero in less than a single nutation period where said spacecraft has a spin axis and a characteristic nutation frequency $\lambda$, comprising:

a torquer for producing a torque of value $T_j$ about a first arbitrary axis j transverse to said spin axis;

means for sensing the nutational motion of the spacecraft about said first transverse axis;

means for energizing said torquer for a time interval $t_2$ which starts at a time which is a predetermined time period $t_1$ after the sensed nutational motion crosses zero on said first axis, where:

$$t_1 = 1/\lambda \cos^{-1}(h_{jO}\lambda/2T_j),$$

where $h_{jO}$ = the peak body momentum about the transverse axis j; and means for de-energizing said torquer after said time interval $t_2$, where:

$$t_2 = 2/\lambda \sin^{-1}(h_{jO}\lambda/2T_j).$$

2. A method for reducing nutation of a momentum stabilized spacecraft to essentially zero in less than a single nutation period where said spacecraft has a spin axis, a torquer providing a torque value about a first arbitrary axis transverse to said spin axis and a characteristic nutation frequency comprising the steps of:

sensing the peak magnitude of nutation motion about said first axis;

starting a timer when the sensed nutational motion on said first axis reaches zero;

starting said torquer at said torquer value when said timer has timed out $t_1$ after the nutational motion reaches zero where $t_1$ is a function of said torque value, said sensed peak magnitude of nutational motion, and said characteristic nutation frequency; and stopping said torquer after time $t_2$ where $t_2$ is a function of said torque value, said sensed peak magnitude of nutational motion, and said characteristic nutation frequency.

3. A method for reducing nutation in a spacecraft in less than a single nutation period having a spin axis and any arbitrary transverse axis designated axis j, which is orthogonal to the spin axis and said spacecraft having a characteristic nutation frequency $\lambda$, comprising the steps of:

sensing the peak magnitude of nutation of the spacecraft by sensing the peak momentum $h_{jO}$ of the spacecraft about the transverse axis j;

at a time $t_1$ after the sensed transverse momentum of the spacecraft has reached a zero-crossing, applying a torque of value $T_j$ to the spacecraft about said transverse axis j; and terminating the application of said torque to said spacecraft after a time period $t_2$, where:

$$t_1 = 1/\lambda \cos^{-1}(h_{jO}\lambda/2T_j)$$

$$t_2 = 2/\lambda \sin^{-1}(h_{jO}\lambda/2T_j).$$

* * * * *